Oct. 9, 1956
C. F. ENGERT
2,765,998
SUPPORTING DEVICE
Filed June 14, 1950
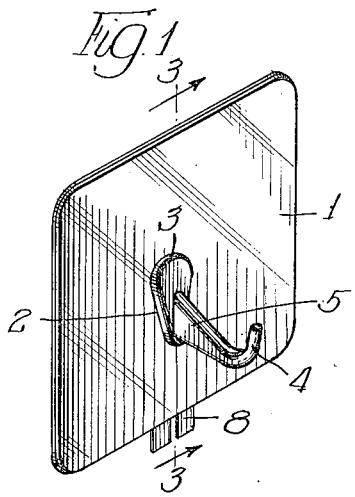
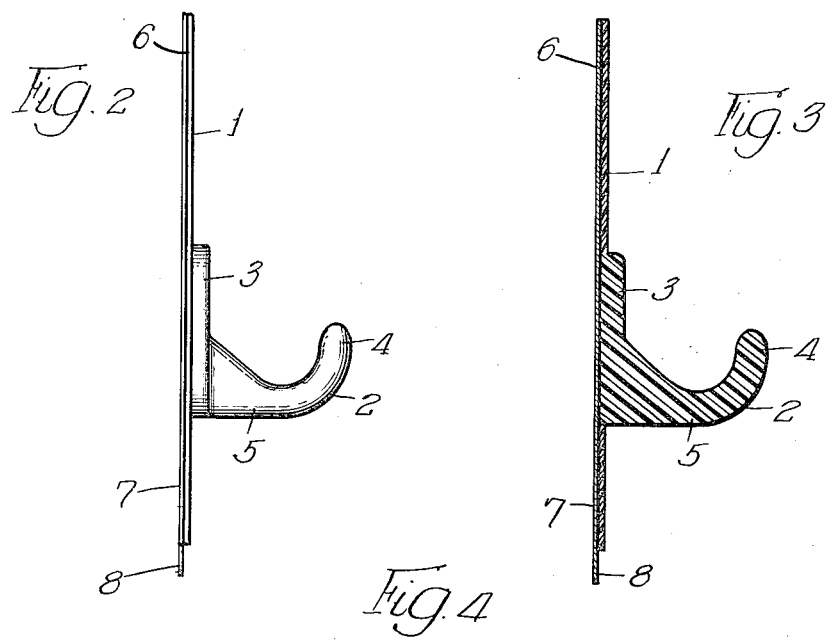
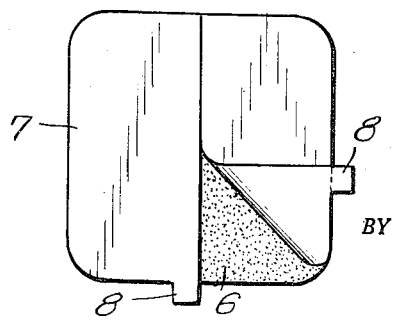
INVENTOR.
Caspar F. Engert,
BY
Atty's

United States Patent Office 2,765,998
Patented Oct. 9, 1956

2,765,998

SUPPORTING DEVICE

Caspar F. Engert, Chicago, Ill., assignor to Poster Products, Inc., Chicago, Ill., a corporation of Illinois Application June 14, 1950, Serial No. 167,961

1 Claim. (Cl. 248—29)

This invention relates to a supporting device for adhesive application to a surface and to a method of manufacturing such a device.

It is an object of the invention to provide a supporting device which can be applied to and removed from walls, windows, mirrors and like smooth surfaces without discoloring or marring the surface.

Another object is to provide a supporting device which is strong, light in weight, removable from one smooth surface to another and capable of supporting a considerable weight.

A further object is to provide a supporting device in which the support member and the body are permanently and securely bonded together.

Still another object of the invention is to provide a new method of bonding the support member and the body.

Other objects and features of the invention will become apparent from a consideration of the following description in the light of the accompanying drawings in which:

Figure 1 is an isometric view of one embodiment of the invention;

Figure 2 is a side view of the same embodiment;

Figure 3 is a sectional view taken along the lines 3—3 of Figure 1; and

Figure 4 is a plan view of the back side of the device illustrated in Figure 1.

Generally stated, the invention relates to a novel and useful supporting device in which a plastic support member is permanently and securely bonded to a plastic sheet and to a novel method of making the device.

Referring to the drawings, Figure 1 represents a preferred embodiment of the supporting device of the present invention. As illustrated therein the device consists of a flexible sheet of plastic or plastic coated material 1 which is arbitrarily shown in the form of a square, but which might assume any shape, such as that of a shield or oval. The sheet 1 has a support member 2 permanently and securely bonded thereto. This bond is so strong that the support member 2 cannot be separated from the sheet 1 without tearing and destroying the sheet. In Figure 3 the base 3 of the support member 2 is illustrated as having formed an integral and permanent bond with the sheet 1. It will be understood that the hook portion 4 of the arm 5 represents only one embodiment of the invention. A shelf or other type of projection can be substituted for the arm 5 and the hook 4.

In Figures 3 and 4 a layer of pressure sensitive adhesive 6 is illustrated on the rear surface of the plastic sheet 1. A number of pressure sensitive adhesives are known and it is contemplated that any suitable one may be employed in the practice of this invention. A natural rubber adhesive has been found to be quite satisfactory. In the sale and distribution of devices of this character it is usually desirable to cover the exposed adhesive surface with a suitable material, such as Holland cloth or paper. Such a covering 7 is illustrated in Figure 4. The projecting tabs 8, 8 facilitate the removal of the backing material 7 from the adhesive.

When it is desired to use the device illustrated herein it is necessary only to remove the backing 7 from the adhesive coated surface 6 and apply the pressure sensitive adhesive surface to any desirable supporting surface. In this respect it is immaterial whether the surface is glass, metal, wood, plaster or a painted surface. The device sticks firmly to the supporting surface for an indefinite period or until there is reason to remove it.

The sheet 1 may be suitably made entirely of a thermoplastic material, such as Vinylite, the vinyl resins, nylon, alkyl resins, styrene, polyethylene and cellulose acetate. It may also be prepared by impregnating a sheet of plain or rubber treated paper. As a third method, the sheet 1 may be prepared by calendering a thin sheet of plastic material onto a sheet of plain or rubber impregnated paper. In any event the invention contemplates the employment of a sheet which will have at least one surface of a thermoplastic resinous material. By the terms Vinylite and vinyl resins is meant the thermoplastic vinyl polymer resins such as polymerized vinyl alcohol, polymerized vinyl acetate, polymerized vinyl chloride and the polymerized copolymers of vinyl chloride, vinyl acetate, vinyl alcohol and vinyl aldehydes and any combination of these materials.

The support member is suitably prepared by the injection molding of a plastic or resinous material into the desired shape. It is contemplated that the resinous material used will be of a like or similar kind to that employed on the surface of the sheet and described above. Thermoplastic materials which are especially suitable are Vinylite and cellulose acetate. The shape of the supporting member 2 is preferably dictated by the uses to which it will be subjected. The integrally molded base 3 of the support member 2 is preferably generally triangular, as shown, with the base or wide part of the triangle upward and the apical portion downward. This provides greater surface area and adherence at the upper part of the molded base 3 and hence greater resistance to the downward pull on the hook 4.

The plastic face of the sheet 1 and the base 3 of the support member 2 are brought together and bonded securely and permanently by taking advantage of certain characteristics of the materials. For exampl, if Vinylite resins are employed in the two plastic elements it is possible to soften the surface of the sheet 1 by applying thereto a small quantity of a solvent therefor, such as methyl ethyl ketone. When the surface of the sheet 1 has become soft, the base 3 of the support element 2 is forced into contact therewith, the plastic materials in the two elements bond together as though the two pieces had become one. This bond is so permanent that it is virtually impossible to separate the two elements without destroying them. Similarly, if a thermoplastic resin, such as cellulose acetate, is employed on the surface of the sheet 1 and in the support member 2, a small quantity of acetone will soften the plastic surface of the sheet and a permanent and secure bond between the sheet and the support member is effected by bringing the two into contact.

Another method comprises softening the base 3 of the support member 2 by immersing it in the solvent and then applying it to the sheet 1. Sufficient solvent is carried over by the base to soften the sheet at the point of application.

It will be understood that the invention is not limited to the use of the two materials disclosed herein for illustrative purposes. A large number of thermoplastic resins are known and the support member and sheet may be prepared using any of them. It will be understood that any combination of thermoplastic materials which are capable of forming the permanent bond disclosed herein may be employed, that is, the plastic sheet may be made of one type of thermoplastic material and the support member of another type so long as the two are capable of forming a permanent bond when softened and forced together.

Although the invention has been described and illustrated herein with particular reference to one form of supporting device, it will be appreciated that the invention may take any shape or design without departing from the spirit of the invention so long as a plastic sheet and a plastic support member are brought together in a secure and permanent bond.

The supporting element 4 is preferably associated with the lower part of the face of the pressure sensitive, adhesively coated sheet, as in Burke U. S. Patent 2,122,999.

From the foregoing disclosure it will be apparent that the present invention provides a supporting device which is inexpensive, light in weight, simple to apply and remove and capable of supporting articles having considerable weight. The device may be applied to any smooth surface and may be removed therefrom at will and transferred to another surface.

The invention is hereby claimed as follows:

As an article of manufacture and sale, a supporting device of the class described comprising a thin flexible sheet material having a face formed of thermoplastic resinous material and a pressure sensitive adhesive back, a molded supporting element formed of thermoplastic resinous material projecting only outwardly from said face and integrally united therewith through an intermediate base of thermoplastic resinous material, said base uniting with only a relatively small portion of said face, and a removable backing material covering the pressure sensitive adhesive back.

References Cited in the file of this patent
UNITED STATES PATENTS

| | | |
|---|---|---|
| 2,096,389 | Bode | Oct. 19, 1937 |
| 2,133,081 | Colvin | Oct. 11, 1938 |
| 2,281,635 | Strauss | May 5, 1942 |
| 2,328,057 | Coulter | Aug. 31, 1943 |
| 2,343,975 | Hosfield | Mar. 14, 1944 |
| 2,453,258 | Pearson | Nov. 9, 1948 |

FOREIGN PATENTS

| | | |
|---|---|---|
| 233,139 | Switzerland | Oct. 2, 1944 |
| 240,755 | Switzerland | May 1, 1946 |
| 564,225 | Great Britain | Sept. 19, 1944 |

OTHER REFERENCES

"Vinylite Plastics—Elastomeric Compounds—Bonding," pamphlet published by Carbide & Carbon Chemicals Corp., copyright 1944, pp. 5 and 9.